US006998189B2

(12) United States Patent
Saito et al.

(10) Patent No.: US 6,998,189 B2
(45) Date of Patent: *Feb. 14, 2006

(54) FUEL CELL SEPARATOR AND PROCESS FOR PRODUCING THE SAME

(75) Inventors: Kazuo Saito, Tokyo (JP); Atsushi Hagiwara, Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 571 days.

This patent is subject to a terminal disclaimer.

(21) Appl. No.: 10/170,466

(22) Filed: Jun. 14, 2002

(65) Prior Publication Data

US 2003/0054221 A1    Mar. 20, 2003

Related U.S. Application Data

(63) Continuation of application No. 09/402,533, filed as application No. PCT/JP99/00481 on Feb. 4, 1999, now abandoned.

(30) Foreign Application Priority Data

Feb. 6, 1998   (JP) .................................. 10-41110

(51) Int. Cl.
*H01M 8/02*    (2006.01)
*B29C 71/00*   (2006.01)

(52) U.S. Cl. .................... 429/39; 429/34; 264/105; 264/232; 29/623.1

(58) Field of Classification Search ................ 429/34, 429/38, 39; 29/623.1; 264/105, 232
See application file for complete search history.

(56) References Cited

U.S. PATENT DOCUMENTS

| | | | | |
|---|---|---|---|---|
| 4,339,322 A | * | 7/1982 | Balko et al. | 429/38 X |
| 5,292,600 A | * | 3/1994 | Kaufman | 429/39 |
| 5,446,424 A | * | 8/1995 | Pierro | 422/186.05 |
| 5,721,293 A | * | 2/1998 | Ichinose et al. | 522/130 |

FOREIGN PATENT DOCUMENTS

| | | | |
|---|---|---|---|
| JP | 3-8866 A | | 1/1991 |
| JP | 7-29562 A | | 1/1995 |
| JP | 7-85997 A | | 3/1995 |
| JP | 7-262997 | * | 10/1995 |
| JP | 7-262997 A | | 10/1995 |
| JP | 10-003931 | * | 1/1998 |
| JP | 10-3931 A | | 1/1998 |

* cited by examiner

*Primary Examiner*—Jonathan Crepeau
(74) *Attorney, Agent, or Firm*—Kubovcik & Kubovcik

(57) ABSTRACT

A fuel cell separator which is low in cost and high in hydrophilicity and electrical conductivity and a process for producing the fuel cell separator. The fuel cell separator is characterized in that by using a starting material for a fuel cell separator subjected to a hydrophilization treatment in a hydrophilizing gas, the surface contact angle of the fuel cell separator as measured by a sessile drop method using water is in a range of 3 to 70°; and the process of the present invention for producing a fuel cell separator is characterized in that a starting material for the fuel cell separator after molding or machining is subjected to a hydrophilization treatment in a hydrophilizing gas and thereby the surface contact angle of the fuel cell separator as measured by a sessile drop method using water is controlled at 3 to 70°.

4 Claims, 1 Drawing Sheet

FUEL CELL SEPARATOR AND PROCESS FOR PRODUCING THE SAME

This application is a continuation of application Ser. No. 09/402,533 filed Nov. 30, 1999 now abandonded, which is a 371 of PCT/JP99/00481 filed Feb. 4, 1999.

TECHNICAL FIELD

The present invention relates to a fuel cell separator and a process for producing the same.

BACKGROUND ART

Fuel cells are advantageous in that they require substantially no fossil fuel (whose depletion in the near future is feared) and, when used for power generation, generate substantially no noise and are high in energy recovery as compared with other methods for power generation. Therefore, fuel cells are being developed as a power generation plant of relatively small size for buildings and factories.

Among fuel cells, a solid polymer type fuel cell operates at lower temperatures than other type fuel cells do; therefore, it has such characteristics that not only the parts constituting the cell are little corroded, but also the cell can discharge a relatively large electric current for the low temperature operation. Therefore, the solid polymer type fuel cell is drawing attention as a substitute electric source for internal combustion engine of vehicle.

Among the parts constituting the above solid polymer type fuel cell, the separator has a role of transferring the electricity generated at the gas diffusion electrode of fuel cell to the exterior and also a role of discharging the water formed in the course of electricity generation to secure a flow path for a reactant gas which is allowed to flow into the fuel cell. Accordingly, the separator for solid polymer type fuel cell is desired to have high drainability.

Therefore, as the fuel cell separator, there have heretofore been used those subjected to a hydrophilization treatment owing to this hydrophilization treatment, the water formed does not remain as droplets and is moved to a given position of the flow path, whereby the diffusion of reactant gas is not hindered by the formed water.

In order to specifically make the fuel cell separator hydrophilic, there were proposed, for example, a method in which a material for fuel cell separator is molded into a predetermined shape and thereafter the molded material is coated with a hydrophilic material (e.g. a polyacrylonitrile) and a method in which a hydrophilic material is incorporated into a material for fuel cell separator and the resulting material is molded into a predetermined shape.

However, it is pointed out that the conventional methods mentioned above have the following problems.

As to the method in which a material for fuel cell separator is molded into a predetermined shape and thereafter the molded material is coated with a hydrophilic material (e.g. a polyacrylonitrile), it is pointed out that the coating with the hydrophilic material gives a separator having an insulating film made of the hydrophilic material, on the whole surface and this insulating film must be removed at the portions of separator contacting with the gas-diffusion electrode of fuel cell, resulting in an increase of cost.

Moreover, as to the method in which a hydrophilic material is incorporated into a material for fuel cell separator and then the resulting material is molded into a predetermined shape, it is pointed out that although cost reduction can be expected, the resistivity of the whole separator is increased because ordinary hydrophilic materials have no electrical conductivity, and the performance of the fuel cell is deteriorated.

Therefore, the solution of the above problems has been desired.

The present invention aims at alleviating the above-mentioned problems of the prior art and providing a fuel cell separator which is low in cost and high in hydrophilicity and electrical conductivity and a process for production of such a fuel cell separator.

DISCLOSURE OF THE INVENTION

The fuel cell separator employed in the present invention for achieving the above aim is characterized in that by using a starting material for fuel cell separator subjected to a hydrophilization treatment in a hydrophilizing gas, the surface contact angle of fuel cell separator as measured by a sessile drop method using water is in a range of 3 to 70°. Also, the process for production of a fuel cell separator, employed in the present invention for achieving the above aim is characterized in that a starting material for fuel cell separator after molding or machining is subjected to a hydrophilization treatment in a hydrophilizing gas and thereby the surface contact angle of fuel cell separator as measured by a sessile drop method using water is controlled at 3 to 70°.

The present inventors made a study in order to achieve the above aim and, as a result, came to an idea that when a starting material for fuel cell separator is subjected to a hydrophilization treatment in a hydrophilizing gas, a fuel cell separator low in cost and high in hydrophilicity and electrical conductivity may be obtained. The present inventors made a further study and, as a result, found out an appropriate range of surface contact angle to be possessed by a fuel cell separator when the contact angle was measured by a sessile drop method using water. The present invention has been completed based on these studies.

BEST MODE FOR CARRYING OUT THE INVENTION

Figure 1:
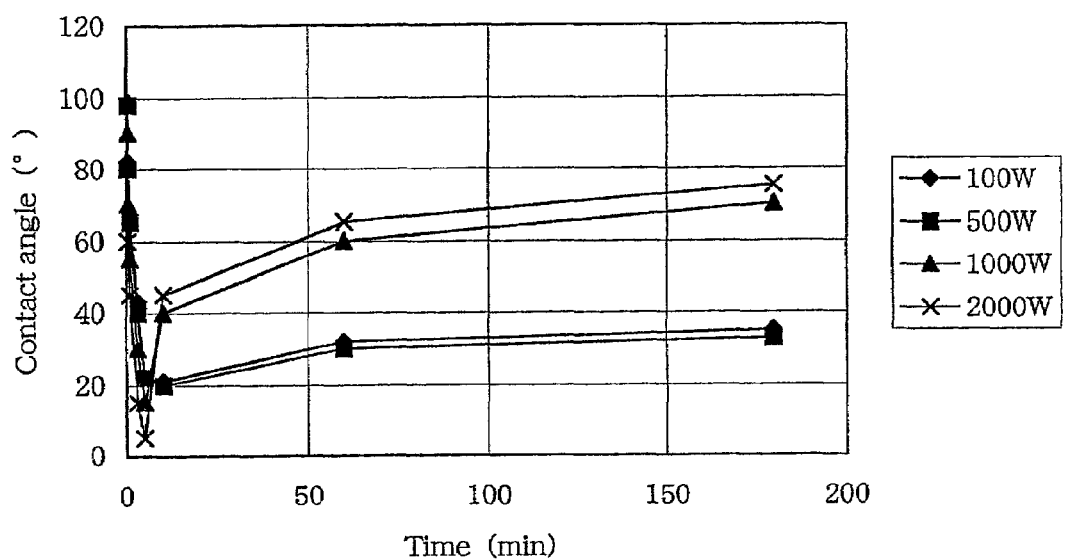
FIG. 1 is a graph showing a relation of discharge output and contact angle as measured by sessile drop method using water, obtained for the fuel cell separator of the present invention produced in Example 1.

The present invention is described in detail below.

As the material for fuel cell separator used in the present invention, there can be used all materials which are used in conventional fuel cell separators, such as carbon moldings obtained by preparing a composite of an electroconductive material and a resin and molding the resulting composite; graphite; glassy carbon materials; titanium; stainless steel; expanded graphite; metals; at least one composite material selected from the group consisting of metals plated with gold, nickel or a lead-carbon composite. Among them, the carbon moldings obtained by preparing a composite of an electroconductive material and a resin and molding the composite are preferred.

As the above electroconductive material, there can be mentioned carbon materials and metal materials. The carbon materials include artificial graphite, scaly natural graphite, lumpy natural graphite, expanded graphite, carbon black, acetylene black, Ketzen Black and amorphous carbon, and these can be used alone or in admixture of two or more.

As the above-mentioned resin, there can be mentioned thermosetting resins, thermoplastic resins, rubbers and cellulose. As the thermosetting resins, there can be mentioned, for example, polycarbodiimide resin, phenolic resin, furfuryl alcohol resin, epoxy resin, urea resin, melamine resin, unsaturated polyester resin, silicone resin, bismaleimidetriazine resin, polyaminobismaleimide resin, diallyl phthalate resin and aromatic polyimide resin.

As the above thermoplastic resins, there can be mentioned, for example, polyethylene, polystyrene, polypropylene, polymethyl methacrylate, polyethylene terephthalate, polybutylene terephthalate, polyether sulfone, polycarbonate, polyoxymethylene, polyamide, polyimide, polyamide-imide, polyvinyl alcohol, polyvinyl chloride, polyphenyl sulfone, polyetheretherketone, polysulfone, polyetherketone, polyarylate, polyetherimide, polymethylpentene, fluororesin, polyoxybenzoyl ester, liquid crystal polyester, aromatic polyester, polyacetal, polyallylsulfone, polybenzoimidazole, polyethernitrile, polythioethersulfone and polyphenyl ether.

As the rubbers, there can be mentioned, for example, fluororubber, silicone rubber, butyl rubber, chloroprene rubber, nitrile rubber, nitrile-chloroprene rubber, chlorinated butyl rubber, chlorinated polyethylene rubber, epichlorohydrin rubber, epichlorohydrin-ethylene oxide rubber, epichlorohydrin-ethylene oxide-glycidyl acrylate copolymer, urethane rubber, acrylic rubber, ethylene-propylene rubber, styrene rubber, butadiene rubber and natural rubber. Use of rubber can allow the obtained separator to have improved impact resistance.

The thermosetting resin, the thermoplastic resin, the rubber and the cellulose may be used in appropriate admixture. Further, there may be added, as necessary, a lubricant, a stabilizer, a crosslinking accelerator, a plasticizer, a vulcanizing agent, etc. for improved moldability, chemical stability and workability.

The fuel cell separator of the present invention is obtained by subjecting the above material for fuel cell separator to a hydrophilization treatment in a hydrophilizing gas. As this hydrophilizing gas, there can be mentioned air, oxygen, ozone, carbon monoxide, carbon dioxide, propane, argon, nitrogen, helium, neon, ammonia, chlorine, fluorine-based gas (e.g. $CF_4$, $C_4F_8$ or $CHF_3$), etc.

As the method for subjecting the material for fuel cell separator to a hydrophilization treatment using the above-mentioned hydrophilizing gas, there can be mentioned a low-temperature plasma treatment, a corona-discharge treatment or an ultraviolet-irradiation treatment. As the apparatus for conducting the low-temperature plasma treatment, corona-discharge treatment or ultraviolet-irradiation treatment, there can be used an apparatus of general use. In the apparatus, the kind of atmosphere gas, the amount of gas flow, the discharge electrode, the discharge output and frequency, the shape of reactor and the rate of discharge gas can be determined depending upon the drainability or contact angle required for the separator to be produced.

In the present invention, the fuel cell separator obtained by subjecting the material for fuel cell separator to the above-mentioned hydrophilization treatment is required to have a surface contact angle of 3° to 70°, preferably 5° to 40°, as measured by a sessile drop method using water. It is because when the surface contact angle is not more than 70°, particularly not more than 40°, the water condensed in the flow path forms a uniform, thin film on at least part of the inner surface of the flow path owing to the pressure of fuel or oxidizing gas, whereby a gas passage can be secured in the flow path. Incidentally, even when this surface contact angle is less than 3°, the gas passage is secured as well; however, in order to make the contact angle less than 3°, it is necessary to increase the output of the hydrophilization treatment apparatus, which is disadvantageous in cost.

The fuel cell separator of the present invention is produced by the production process of the present invention described below.

First of all, the material for fuel cell separator is subjected to molding or machining. This molding or machining can be carried out without any particular problem by a means adopted in the production of conventional fuel cell separator, for example, by molding under heat and pressure.

Subsequently, the material for fuel cell separator subjected to molding or machining is subjected to a hydrophilization treatment using a hydrophilizing gas to obtain a separator for fuel cell. The details of the hydrophilizing gas and hydrophilization treatment step which are used in the production process of the present invention, and the range of surface contact angle of fuel cell separator obtained thereby, have been described above.

The present invention is described in more detail below by way of Examples.

EXAMPLE 1

Scaly graphite and a phenolic resin were mixed in a weight ratio of 80:20 using a Henschel mixer. The resulting mixture was molded into a separator shape under the molding conditions of 150° C., 200 kg/cm$^2$ and 5 minutes. The molded material (a starting material for fuel cell separator) was subjected to low-temperature plasma treatments under the conditions of hydrophilizing gas=oxygen and output×time=100 W×1 to 180 minutes, 500 W×1 to 180 minutes, 1000 W×0.5 to 180 minutes and 2000 W×0.5 to 60 minutes. The separators obtained were measured for contact angle against pure water and shown in a graph of FIG. 1. The separators were also measured for resistivity and drainability; and the contact angle, resistivity and drainability of each separator are shown in Table 1. Incidentally, contact angle was measured by a sessile drop method using pure water, using a contact angle tester, CA-D Model produced by Kyowa Kaimen Kagaku. Resistivity was measured by a four-probe method. (The same applies also to the following Examples and Comparative Examples.)

TABLE 1

Example 1

Hydrophilization

| Hydrophilization method | Low-temperature plasma treatment | Low-temperature plasma treatment | Low-temperature plasma treatment | Low-temperature plasma treatment | Low-temperature plasma treatment | Low-temperature plasma treatment | Low-temperature plasma treatment | Low-temperature plasma treatment | Low-temperature plasma treatment |
|---|---|---|---|---|---|---|---|---|---|
| Hydrophilizing gas | Oxygen | Oxygen | Oxygen | Oxygen | Oxygen | Oxygen | Oxygen | Oxygen | Oxygen |
| Output(W) | 500 | 500 | 500 | 1000 | 500 | 500 | 500 | 100 | 2000 |
| Time(min) | 3 | 5 | 10 | 5 | 1 | 60 | 180 | 5 | 5 |
| Contact angle(°) | 40 | 22 | 20 | 15 | 65 | 30 | 33 | 50 | 5 |
| Resistivity(mΩ · cm) | 20 | 15 | 14 | 12 | 21 | 14 | 32 | 22 | 30 |
| Drainability | Very good | Very good | Very good | Very good | Very good | Very good | Very good | Very good | Very good |

As is clear from FIG. 1, when the output of low-temperature plasma treatment is about 100 to 500 W, the contact angle of fuel cell separator can be made as low as about 20° and thereafter shows no change or slight increase; and, even if the treatment is conducted over a long time, there seems to be little possibility that the contact angle deviates from the range required for the fuel cell separator of the present invention. Meanwhile, when the output is increased to about 1000 to 2000 W, the contact angle of fuel cell separator can be made as low as 5° depending upon the case but, thereafter, shows increase possibly owing to the surface change (attack) of starting material by high output. Therefore, when a starting material is subjected to a long-time treatment at a high output of about 1000 to 2000 W, the obtained fuel cell separator may have a contact angle deviating from the range required for the fuel cell separator of the present invention.

The above tendency is approximately the same even when the kind of hydrophilizing gas or the method of hydrophilization is changed. However, a hydrophilizing gas having a higher oxidizing property or a hydrophilization method having a higher effect on starting material for fuel cell separator can produce a fuel cell separator having a lower contact angle.

EXAMPLE 2

Scaly graphite and a phenolic resin were mixed in a weight ratio of 80:20 using a Henschel mixer. The resulting mixture was molded into a separator shape under the molding conditions of 150° C., 200 kg/cm$^2$ and 5 minutes. The molded material (a starting material for fuel cell separator) was subjected to low-temperature plasma treatments under the conditions of hydrophilizing gas=air and output×time=100 W×1 to 180 minutes, 500 W×1 to 180 minutes, 1000 W×0.5 to 180 minutes and 2000 W×0.5 to 60 minutes. The separators obtained were measured for contact angle, resistivity and drainability; and the measurement results are shown in Table 2.

TABLE 2

Example 2

Hydrophilization

| Hydrophilization method | Low-temperature plasma treatment | Low-temperature plasma treatment | Low-temperature plasma treatment | Low-temperature plasma treatment | Low-temperature plasma treatment | Low-temperature plasma treatment | Low-temperature plasma treatment | Low-temperature plasma treatment |
|---|---|---|---|---|---|---|---|---|
| Hydrophilizing gas | Air | Air | Air | Air | Air | Air | Air | Air |
| Output(W) | 500 | 500 | 500 | 500 | 500 | 100 | 1000 | 2000 |
| Time(min) | 1 | 5 | 10 | 60 | 180 | 5 | 5 | 5 |
| Contact angle(°) | 48 | 30 | 28 | 38 | 40 | 57 | 22 | 13 |
| Resistivity(mΩ · cm) | 20 | 18 | 15 | 14 | 30 | 32 | 12 | 18 |
| Drainability | Very good | Very good | Very good | Very good | Very good | Very good | Very good | Very good |

EXAMPLE 3

Scaly graphite and a phenolic resin were mixed in a weight ratio of 80:20 using a Henschel mixer. The resulting mixture was molded into a separator shape under the molding conditions of 150° C., 200 kg/cm$^2$ and 5 minutes. The molded material (a starting material for fuel cell separator) was subjected to low-temperature plasma treatments under the conditions of hydrophilizing gas=argon and output×time=500 W×180 minutes. The separator obtained was measured for contact angle, resistivity and drainability; and the measurement results are shown in Table 3.

TABLE 3

| Example 3 | |
|---|---|
| Hydrophilization | |
| Hydrophilization method | Low-temperature plasma treatment |
| Hydrophilizing gas | Argon |
| Output(W) | 500 |
| Time(min) | 180 |
| Contact angle(°) | 40 |
| Resistivity(mΩ · cm) | 20 |
| Drainability | Very good |

EXAMPLE 4

The carbon composite material obtained in Example 1 (a 80:20 mixture of scaly graphite and a phenolic resin) was molded into a separator shape under the molding conditions of 150° C., 200 kg/cm$^2$ and 5 minutes. The obtained molded material (a starting material for fuel cell separator) was subjected to corona-discharge treatments under the conditions shown in Table 4 (air atmosphere, various outputs and various treatment times). The obtained separators were measured for contact angle, resistivity and drainability in the same manners as in Example 1, and the measurement results are shown in Table 4.

EXAMPLE 5

The carbon composite material obtained in Example 1 (a 80:20 mixture of scaly graphite and a phenolic resin) was molded into a separator shape under the molding conditions of 150° C., 200 kg/cm$^2$ and 5 minutes. The obtained molded material (a starting material for fuel cell separator) was subjected to hydrophilization treatments using an ultraviolet lamp, under the conditions shown in Table 4 (air atmosphere, various outputs and various treatment times). The obtained separators were measured for contact angle, resistivity and drainability in the same manners as in Example 1, and the measurement results are shown in Table 4.

EXAMPLE 6

A starting material for fuel cell separator, obtained by subjecting graphite to machining into a separator shape was subjected to a plasma hydrophilization treatment in an air atmosphere at an output of 500 W. The obtained separator was measured for contact angle, resistivity and drainability in the same manners as in Example 1, and the measurement results are shown in Table 5.

EXAMPLE 7

A starting material for fuel cell separator, obtained by molding an expanded graphite sheet into a separator shape was subjected to a plasma hydrophilization treatment in an air atmosphere at an output of 500 W. The obtained separator was measured for contact angle, resistivity and drainability in the same manners as in Example 1, and the measurement results are shown in Table 5.

EXAMPLE 8

A starting material for fuel cell separator, obtained by plating stainless steel with gold was subjected to a plasma hydrophilization treatment in an air atmosphere at an output of 500 W. The obtained separator was measured for contact angle, resistivity and drainability in the same manners as in Example 1, and the measurement results are shown in Table 5.

EXAMPLE 9

On the both sides of a stainless steel sheet was laminated a mixture obtained by mixing scaly graphite and a phenolic resin at a weight ratio of 80:20 using a Henschel mixer. The resulting laminate was molded into a separator shape under the molding conditions of 150° C., 200 kg/cm$^2$ and 5 minutes. The obtained starting material for fuel cell separator was subjected to a plasma hydrophilization treatment in an air atmosphere at an output of 500 W. The obtained separator was measured for contact angle, resistivity and drainability in the same manners as in Example 1, and the measurement results are shown in Table 5.

TABLE 4

| | Example 4 | | | | | | | Example 5 | | | | |
|---|---|---|---|---|---|---|---|---|---|---|---|---|
| Hydrophilization | | | | | | | | | | | | |
| Hydrophilization method | Corona-discharge treatment | Corona-discharge treatment | Corona-discharge treatment | Corona-discharge treatment | Corona-discharge treatment | Corona-discharge treatment | Corona-discharge treatment | Ultraviolet-irradiation treatment | Ultraviolet-irradiation treatment | Ultraviolet-irradiation treatment | Ultraviolet-irradiation treatment | Ultraviolet-irradiation treatment |
| Hydrophilizing gas | Air | Air | Air | Air | Air | Air | Air | Air | Air | Air | Air | Air |
| Output(W) | 500 | 500 | 500 | 500 | 500 | 1000 | 2000 | 500 | 500 | 500 | 500 | 500 |
| Time(min) | 1 | 5 | 10 | 60 | 180 | 5 | 5 | 1 | 5 | 10 | 60 | 180 |
| Contact angle(°) | 53 | 33 | 33 | 40 | 45 | 28 | 18 | 60 | 40 | 48 | 40 | 53 |
| Resistivity (mΩ · cm) | 22 | 17 | 17 | 33 | 14 | 32 | 19 | 28 | 21 | 21 | 40 | 20 |
| Drainability | Very good | Very good | Very good | Very good | Very good | Very good | Very good | Very good | Very good | Very good | Very good | Very good |

TABLE 5

| | Example 6 | Example 7 | Example 8 | Example 9 |
|---|---|---|---|---|
| Hydrophilization | | | | |
| Hydrophilization method | Low-temperature plasma treatment | Low-temperature plasma treatment | Low-temperature plasma treatment | Low-temperature plasma treatment |
| Hydrophilizing gas | Air | Air | Air | Air |
| Output(W) | 500 | 500 | 500 | 500 |
| Time(min) | 5 | 5 | 5 | 5 |
| Contact angle(°) | 35 | 28 | 27 | 40 |
| Resistivity(mΩ · cm) | 3 | 5 | 0.9 | 19 |
| Drainability | Very good | Very good | Very good | Very good |

COMPARATIVE EXAMPLE 1

Scaly graphite, a phenolic resin and $SiO_2$ (a hydrophilic substance) were mixed at a weight ratio of 80:20:5 using a Henschel mixer. The resulting mixture was molded into a separator shape under the molding conditions of 150° C., 200 kg/cm² and 5 minutes. The obtained separator was measured for contact angle, resistivity and drainability in the same manners as in Example 1, and the measurement results are shown in Table 6.

COMPARATIVE EXAMPLE 2

The molded material before low-temperature plasma hydrophilization treatment, obtained in Example 1 was measured for contact angle, resistivity and drainability in the same manners as in Example 1, and the measurement results are shown in Table 6.

COMPARATIVE EXAMPLE 3

Separators were obtained in the same manner as in Example 1 except that the output×time was 100 W×0.25 to 0.5 minute, 500 W×0.25 to 0.5 minute, 100 W×0.25 minute and 2000 W×0.25 minute and 180 minutes, and measured for contact angle against pure water.

COMPARATIVE EXAMPLE 4

The starting material for separator before hydrophilization treatment, used in Example 6 was measured for contact angle, resistivity and drainability in the same manners as in Example 1, and the measurement results are shown in Table 6.

COMPARATIVE EXAMPLE 5

The starting material for separator before hydrophilization treatment, used in Example 7 was measured for contact angle, resistivity and drainability in the same manners as in Example 1, and the measurement results are shown in Table 6.

COMPARATIVE EXAMPLE 6

The starting material for separator before hydrophilization treatment, used in Example 8 was measured for contact angle, resistivity and drainability in the same manners as in Example 1, and the measurement results are shown in Table 6.

COMPARATIVE EXAMPLE 7

The starting material for separator before hydrophilization treatment, used in Example 9 was measured for contact angle, resistivity and drainability in the same manners as in Example 1, and the measurement results are shown in Table 6.

TABLE 6

| | Comparative Example 1 | Comparative Example 2 | Comparative Example 4 | Comparative Example 5 | Comparative Example 6 | Comparative Example 7 |
|---|---|---|---|---|---|---|
| Contact angle(°) | 80 | 99 | 120 | 80 | 120 | 98 |
| Resistivity (mΩ · cm) | 30 | 15 | 6 | 1.0 | 20 | 14 |
| Drainability | Bad | Bad | Bad | Bad | Bad | Bad |

Industrial Applicability

As described above, the fuel cell separator of the present invention has high hydrophilicity; therefore, even when the steam generated by the reaction of fuel cell remains as condensed water in the flow path of gas (this is seen at the start of fuel cell operation), the condensed water can be moved in the flow path by the pressure of the gas fed at the operational start and can be converted into a uniform thin film covering the inner surface of flow path; as a result, a gas passage is secured in the flow path of gas and the fuel cell can be operated stably from the start.

Further, the fuel cell separator of the present invention has high electrical conductivity and sufficiently has the function to be possessed by fuel cell separators.

Furthermore, the process for production of fuel cell separator according to the present invention can provide the above-mentioned useful fuel cell separator of the present invention at a low cost and is an excellent process.

The invention claimed is:

1. A process for producing a fuel cell separator, comprising preparing a composite of an electroconductive carbon material and resin, molding the composite into a separator shape having a flow path for diffusion of a reactant gas and subjecting said molding to a hydrophilization treatment in a hydrophilizing gas to provide said fuel cell separator having a surface contact angle as measured by a sessile drop method using water in a range of 3 to 70°.

2. A process producing a fuel cell separator according to claim 1, wherein the hydrophilizing gas is at least one kind of gas selected from air, oxygen, ozone, carbon monoxide, carbon dioxide, propane, argon, nitrogen, helium, neon, ammonia, chlorine and a fluorine-based gas, or a mixed gas of two or more of the above gases.

3. A process producing a fuel cell separator according to claim 1, wherein the hydrophilization treatment is a low-temperature plasma treatment, a corona-discharge treatment or an ultraviolet-irradiation treatment.

4. A process for producing a fuel cell separator according to claim 1, wherein the surface contact angle is in a range of 5 to 40°.

* * * * *

UNITED STATES PATENT AND TRADEMARK OFFICE
CERTIFICATE OF CORRECTION

PATENT NO.   : 6,998,189 B2
DATED        : February 14, 2006
INVENTOR(S)  : Kazuo Saito and Atsushi Hagiwara It is certified that error appears in the above-identified patent and that said Letters Patent is hereby corrected as shown below:

Title page,
Item [*] Notice, delete "This patent is subject to a terminal disclaimer".

Signed and Sealed this

Twenty-third Day of May, 2006

JON W. DUDAS
*Director of the United States Patent and Trademark Office*